(12) United States Patent  
Banerjee et al.

(10) Patent No.: US 9,319,280 B2  
(45) Date of Patent: Apr. 19, 2016

(54) CALCULATING THE EFFECT OF AN ACTION IN A NETWORK

(71) Applicant: International Business Machines Corporation, Armonk, NY (US)

(72) Inventors: Pradipta K Banerjee, Bangalore (IN); Ashish Billore, Bangalore (IN); Divya K Konoor, Bangalore (IN); Nanjangud C. Narendra, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/470,680

(22) Filed: Aug. 27, 2014

(65) Prior Publication Data

US 2015/0149620 A1 May 28, 2015

Related U.S. Application Data

(63) Continuation of application No. 14/089,262, filed on Nov. 25, 2013.

(51) Int. Cl.
 *G06F 15/173* (2006.01)
 *H04L 12/24* (2006.01)
 (Continued)

(52) U.S. Cl.
 CPC ............ *H04L 41/14* (2013.01); *G06F 9/45533* (2013.01); *H04L 43/08* (2013.01)

(58) Field of Classification Search
 CPC .......................... H04L 29/06; H04L 29/08072
 USPC .......................................................... 709/224
 See application file for complete search history.

(56) References Cited

U.S. PATENT DOCUMENTS 6,154,849 A     11/2000   Xia
6,763,380 B1 *   7/2004   Mayton ................... H04L 41/14
                                                                       709/223

(Continued)

FOREIGN PATENT DOCUMENTS

WO        2011162848 A3     12/2011

OTHER PUBLICATIONS

Dilip K. Prasad, High Availability Based Migration Analysis to Cloud Computing for High Growth Business, International Journal of Computer Networks (IJCN), (vol. 4) : Issue (2) : 2012.

(Continued)

*Primary Examiner* — Vivek Srivastava
*Assistant Examiner* — Atta Khan
(74) *Attorney, Agent, or Firm* — Kunzler Law Group; Steven Bennett (57) ABSTRACT

A method for calculating the effect of an action on a network includes creating a mapping of a plurality of devices of a networked computing environment. In one embodiment, the mapping describes a relationship between a primary device and at least one device of the plurality of devices. In another embodiment, the method includes determining a plurality of potential actions to be performed on the primary device. In a further embodiment, the method includes calculating an effect of a potential action of the plurality of potential actions on the plurality of devices in response to simulating performing the potential action on the primary device. In yet another embodiment, the method includes performing an optimization action in response to calculating the effect of the potential action. In certain embodiments, the optimization action maximizes availability of the networked computing environment.

13 Claims, 6 Drawing Sheets

(51) Int. Cl.
*H04L 12/26* (2006.01)
*G06F 9/455* (2006.01)

(56) References Cited

U.S. PATENT DOCUMENTS

| | | | |
|---|---|---|---|
| 6,950,865 B1* | 9/2005 | Depaolantonio | H04L 43/065 709/223 |
| 7,222,268 B2 | 5/2007 | Zaifman et al. | |
| 7,630,313 B2 | 12/2009 | Batni et al. | |
| 7,660,888 B2 | 2/2010 | Smyth et al. | |
| 7,664,712 B1 | 2/2010 | Duvall et al. | |
| 7,913,105 B1 | 3/2011 | Ganesh et al. | |
| 8,230,051 B1* | 7/2012 | Zahavi | H04L 41/5009 709/203 |
| 8,570,861 B1* | 10/2013 | Brandwine | H04L 45/00 370/230 |
| 2004/0078419 A1* | 4/2004 | Ferrari et al. | 709/201 |
| 2004/0081092 A1* | 4/2004 | Rhee et al. | 370/230 |
| 2006/0047815 A1 | 3/2006 | Hamadi | |
| 2007/0061461 A1 | 3/2007 | Hicks et al. | |
| 2009/0300173 A1* | 12/2009 | Bakman | G06F 11/008 709/224 |
| 2010/0318931 A1* | 12/2010 | Boykin | G06F 3/0482 715/771 |
| 2011/0131252 A1* | 6/2011 | Son | H04L 41/0893 707/803 |
| 2011/0161964 A1* | 6/2011 | Piazza | G06F 9/4881 718/102 |
| 2011/0225277 A1* | 9/2011 | Freimuth | G06F 9/45558 709/223 |
| 2012/0047394 A1 | 2/2012 | Jain et al. | |
| 2012/0180041 A1* | 7/2012 | Fletcher | G06F 9/45558 718/1 |
| 2012/0198057 A1 | 8/2012 | Ennis, Jr. et al. | |
| 2012/0198375 A1 | 8/2012 | Carter et al. | |
| 2013/0239107 A1* | 9/2013 | Zadka | G06F 9/455 718/1 |
| 2013/0283246 A1* | 10/2013 | Krajec | G06F 11/3466 717/130 |

OTHER PUBLICATIONS

Scenario: Determine the impact of a failing resource, http://publib.boulder.ibm.com/infocenter/eserver/v1r2/topic/veicinfo/eica, Oct. 6, 2011.
IBM, Provisioning the compute resource temporarily on the backup system in the event of HA failover, IPCOM000152842D, ip.com, May 14, 2007.
IBM, Method and System for Demand and Resource Mapping in a Cloud Computing System, IPCOM000181002D, Mar. 23, 2009.
Ryan Blue, et al., Visualizing Real-Time Network Resource Usage, http://www.cs.umd.edu/~cdunne/hcil/pubs/Blue08VisualizingReal-TimeNetwork.pdf, 2008.
U.S. Appl. No. 14/089,262 Office Action mailed Dec. 19, 2014.

* cited by examiner

CALCULATING THE EFFECT OF AN ACTION IN A NETWORK

FIELD

The subject matter disclosed herein relates to computer networks and more particularly relates to calculating the effect of an action on the devices within the network.

BACKGROUND

Description of the Related Art

Computer networks involve complex inter-relationships between a variety of computing devices, including both physical and virtual devices. In order to maintain the functionality of the devices on the computer network, various actions may need to be performed on the devices, such as shutting-down a server, performing backups on a server, rebooting a virtual machine, etc. These actions can have negative side-effects on the availability of the network, which can cause users to not be able to access resources normally available via the network.

BRIEF SUMMARY

A method for calculating the effect of an action on a network is disclosed. An apparatus and computer program product also perform the functions of the method. The method for calculating the effect of an action on a network includes creating a mapping of a plurality of devices of a networked computing environment. In one embodiment, the mapping describes a relationship between a primary device and at least one device of the plurality of devices. In another embodiment, the method includes determining a plurality of potential actions to be performed on the primary device. In a further embodiment, the method includes calculating an effect of a potential action of the plurality of potential actions on the plurality of devices in response to simulating performing the potential action on the primary device.

In yet another embodiment, the method includes performing an optimization action in response to calculating the effect of the potential action. In certain embodiments, the optimization action maximizes availability of the networked computing environment. In one embodiment, the optimization action includes predicting an optimal placement of a virtual machine within the networked computing environment according to the calculated effect of the potential action. The optimal placement of the virtual machine, in some embodiments, is determined according to a real-time interaction heuristic of the plurality of devices of the networked computing environment.

In one embodiment, the optimization action includes optimizing workload scheduling associated with one or more devices of the plurality of devices according to the calculated effect of the potential action. In some embodiments, the optimal workload scheduling is determined according to a real-time interaction heuristic of the plurality of devices of the networked computing environment. In another embodiment, the optimization action includes predicting an availability of a device of the plurality of devices according to the calculated effect of the potential action.

In a further embodiment, the optimization action includes determining a monetary cost of the calculated effect of the potential action. In another embodiment, a potential action is performed in response to the calculated effect having a monetary cost below a predetermined threshold. The optimization action, in one embodiment, includes determining the optimal time to perform the potential action according to the calculated effect of the potential action such that the effect of the potential action on the plurality of devices is minimal.

In yet another embodiment, the optimization action includes maintaining an availability of a critical device, which may be determined according to a criticality factor. The criticality factor, in certain embodiments, defines the importance of the device to the operation of the networked computing environment. Devices with a criticality factor above a predetermined threshold, in some embodiments, are tagged as critical devices. In one embodiment, the method includes monitoring one or more simulated actions such that the calculated effects of the one or more simulated actions are analyzed to provide intelligent recommendations associated with maintaining the availability of the networked computing environment.

In another embodiment, the method includes presenting the calculated effect of the potential action to a user such that the calculated effect is displayed on a visual map that includes the plurality of devices of the networked computing environment. In a further embodiment, the method includes ranking a device according to an effect level associated with the device. The effect level, in one embodiment, defines the magnitude of the calculated effect of the potential action on the device. The effect level of the device, in another embodiment, is compared to the effect level of a different device.

In one embodiment, the mapping of the plurality of devices is created according to real-time interactions between the primary device and the plurality of devices. In another embodiment, the calculated effect includes a count of devices effected by the potential action, a count of users effected by the potential action, a degree of impact of the potential action on a device of the plurality of devices, a duration of the calculated effect of the potential action, and/or a frequency of the calculated effect of a regularly performed potential action. In certain embodiments, calculating an effect of a potential action of the plurality of potential actions on the plurality of devices includes using the relationship between the plurality of devices from the mapping to calculate the effect of the potential action on the plurality of device.

An apparatus is included with a mapping module configured to create a mapping of a plurality of devices of a networked computing environment. In one embodiment, the mapping describes a relationship between a primary device and at least one device of the plurality of devices. In another embodiment, the apparatus includes an action module configured to determine a plurality of potential actions to be performed on the primary device. In yet another embodiment, the apparatus includes a calculation module configured to calculate an effect of a potential action of the plurality of potential actions on the plurality of devices in response to simulating performing the potential action on the primary device. The apparatus, in a further embodiment, includes an optimization module configured to perform an optimization action in response to calculating the effect of the potential action such that the optimization action maximizes availability of the networked computing environment.

In one embodiment, the optimization action includes predicting an optimal placement of a virtual machine within the networked computing environment according to the calculated effect of the potential action. In another embodiment, calculating an effect of a potential action of the plurality of potential actions on the plurality of devices includes using the relationship between the plurality of devices from the mapping to calculate the effect of the potential action on the plurality of devices. In yet another embodiment, the apparatus includes a presentation module configured to present the calculated effect of the potential action to a user. In one embodiment, the calculated effect is displayed on a visual map that includes the plurality of devices of the networked computing environment.

A computer program product is included for calculating the effect of an action on a network is disclosed. The computer program product includes a computer readable storage medium having program code embodied therein. The program code is readable and/or executable by a processor to execute the steps of the method. In one embodiment, the steps include creating a mapping of a plurality of devices of a networked computing environment. In one embodiment, the mapping describes a relationship between a primary device and at least one device of the plurality of devices.

In another embodiment, the steps include determining a plurality of potential actions to be performed on the primary device. In a further embodiment, the steps include calculating an effect of a potential action of the plurality of potential actions on the plurality of devices in response to simulating performing the potential action on the primary device. In yet another embodiment, the steps include performing an optimization action in response to calculating the effect of the potential action. In certain embodiments, the optimization action maximizes availability of the networked computing environment.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Figure 1:
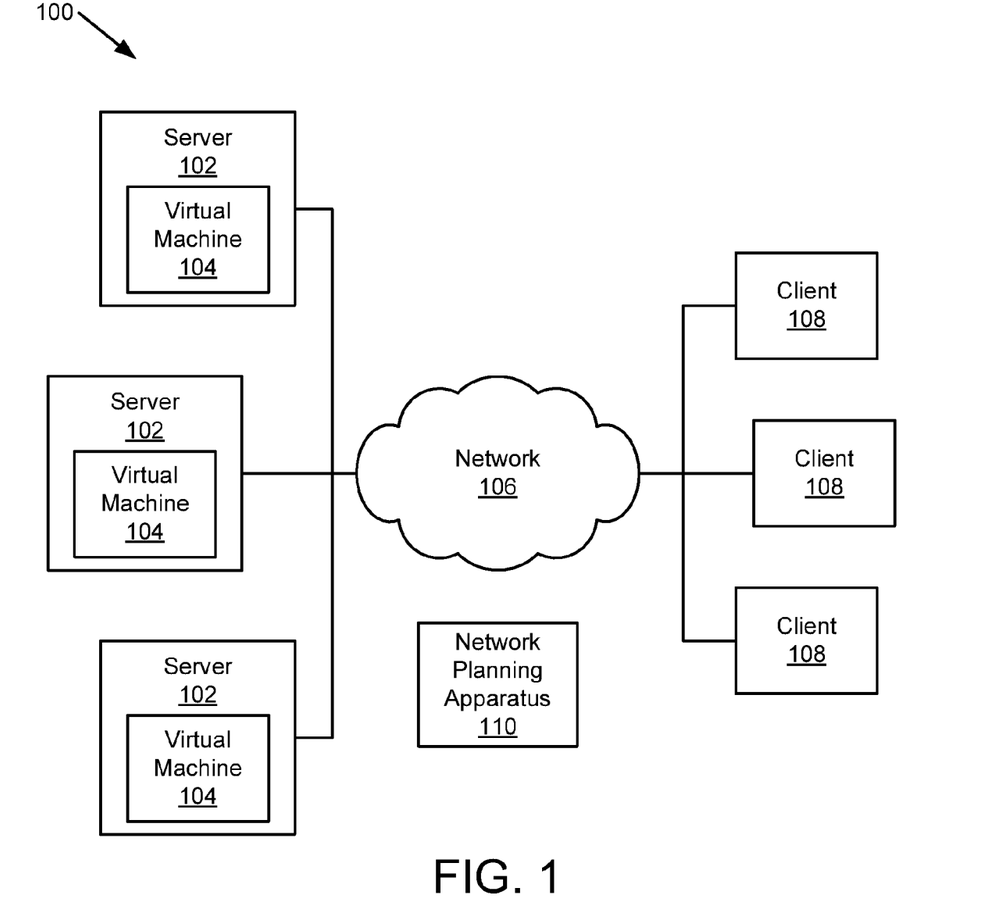
FIG. 1 is a schematic block diagram illustrating one embodiment of a system for calculating the effect of an action on a network.

FIG. 1 depicts one embodiment of a system 100 for calculating the effect of an action on a network. In certain embodiments, the system 100 includes a plurality of devices, including servers 102, virtual machines 104, and clients 108, which are described below. In another embodiment, the system 100 further includes a network 106 and a network planning apparatus 110, which are also described in more detail below. Although the system 100 depicts a specific number of networking components 102-110, any number of networking components 102-110 may be included in the system 100.

In one embodiment, the system 100 includes one or more servers 102. A server 102, in some embodiments, is embodied as a desktop computer, a laptop computer, a main frame, a blade server, a cloud server, a rack server, and/or the like. A server 102, in another embodiment, includes a database server, a file server, a mail server, a print server, a web server, a gaming server, an application, and/or the like. In certain embodiments, a server 102 stores data that is accessible to a plurality of clients 108 connected to the server 102 through the network 106.

In a further embodiment, the system 100 includes a virtual machine 104. The virtual machine 104 may be located on a server 102. In certain embodiments, a server 102 instantiates and runs a plurality of virtual machines 104. As used herein, a virtual machine 104 is a system platform that supports the execution of a complete operating system in order to more efficiently use hardware on a single server 102. For example, a server 102 may instantiate a virtual machine 104 running an instance of the Microsoft® Windows® operating system. The same server 102 may also instantiate a virtual machine 104 running an instance of a Linux operating system. In another example, a virtual machine 104 may run an instance of other operating systems such as the z/OS®, z/VM®, or AIX® operating systems from IBM®. In some embodiments, a virtual machine 104 runs one or more server programs, such as a web server, a mail server, a print server, and/or the like. In certain embodiments, a plurality of clients 108 are connected to one more virtual machines 104 through the network 106.

In a further embodiment, the system 100 includes a network 106. The network 106, in one embodiment, is embodied as a digital communication network 106 that transmits digital communications between a plurality of devices, such as between a server 102 and a client 108. The digital communication network 106 may include a wireless network, such as a wireless telephone network, a local wireless network, such as a Wi-Fi network, a Bluetooth® network, and the like. The digital communication network 106 may include a wide area network ("WAN"), a storage area network ("SAN"), a local area network ("LAN"), an optical fiber network, the internet, or other digital communication network known in the art. The digital communication network 106 may include two or more networks. The digital communication network 106 includes one or more servers 102, routers, switches, and other networking equipment. The digital communication network 106 may also include computer readable storage media, such as a hard disk drive, an optical drive, non-volatile memory, random access memory ("RAM"), or the like.

In one embodiment, the system 100 includes one or more clients 108 connected to one or more servers 102 and/or virtual machines 104. A client 108 may be embodied as a desktop computer, a laptop computer, a tablet computer, a smart phone, a smart TV, a smart watch, and/or the like. In certain embodiments, a client 108 communicates with the one or more servers 102 and/or virtual machines 104 through the data network 106. In a further embodiment, a client 108 runs an instance of a program to communicate with and access data from a server 102. For example, a client 108 may run an instance of a web browser that is in communication with a web server 102. In another example, a client 108 may run an instance of an email program that is in communication with an email server 102. In certain embodiments, a user interacts with a client device 108.

In another embodiment, the system 100 includes a network planning apparatus 110. In certain embodiments, the network planning apparatus 110 is configured to create a mapping of the relationships between different devices within the network, such as the relationship between a virtual machine 104 and a client 108. The network planning apparatus 110, in one embodiment, determines a plurality of potential actions that can be performed on a primary device and that can have an effect on one or more devices connected to the primary device through the network 106 if the action is actually performed. In a further embodiment, the network planning apparatus 110 calculates the effect of a potential action on the plurality of devices by simulating performing the action on the primary device.

In another embodiment, the network planning apparatus 110 performs an optimization action based on the calculated effect of the potential action on the networked devices in order to maintain the highest availability of the devices. In certain embodiments, at least a portion of the network planning apparatus 110 is located on a server 102, a virtual machine 104, a client 108, and/or different networking devices of the network 106, such as switches, hubs, routers, and/or the like. In certain embodiments, the network planning apparatus 110 includes one or more modules that perform the operations of the apparatus 110. The network planning apparatus 110, including its associated modules, is described in more detail below with reference to FIGS. 2 and 3.

Figure 2:
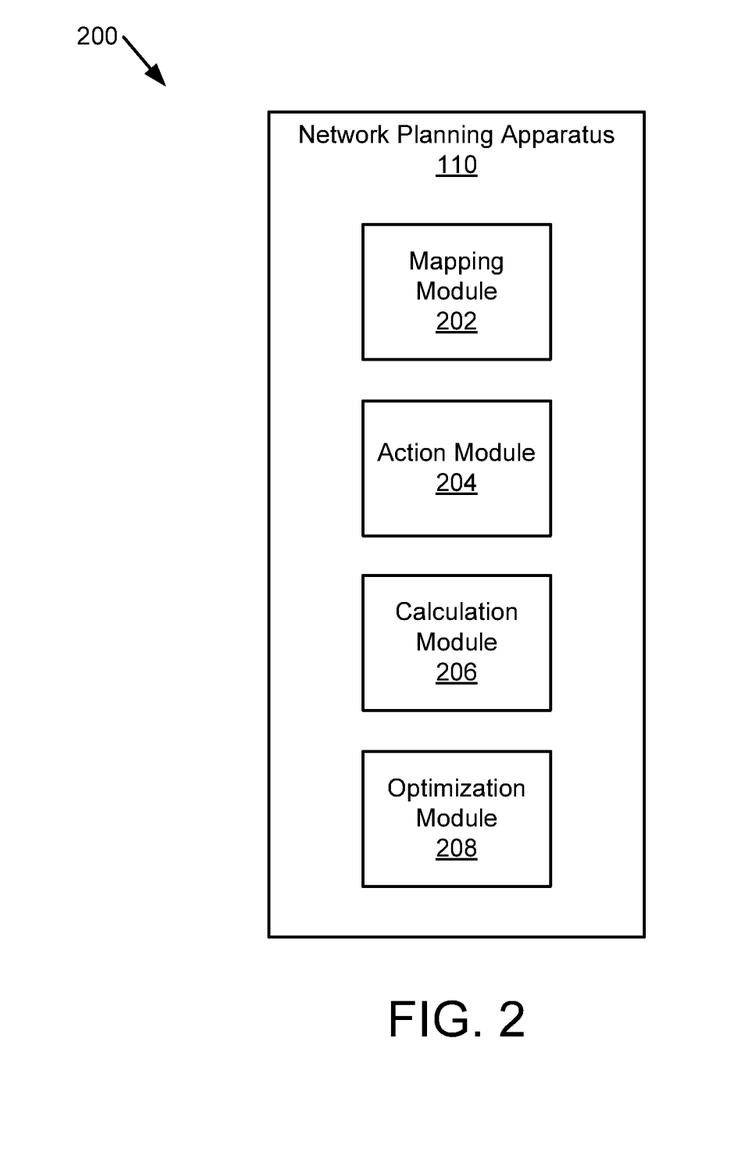
FIG. 2 is a schematic block diagram illustrating one embodiment of an apparatus for calculating the effect of an action on a network.

FIG. 2 depicts one embodiment of an apparatus 200 for calculating the effect of an action on a network. In one embodiment, the apparatus 200 includes a network planning apparatus 110. The network planning apparatus 110, in certain embodiments, includes a mapping module 202, an action module 204, a calculation module 206, and an optimization module 208, which are described in more detail below.

In one embodiment, the network planning apparatus 110 includes a mapping module 202 configured to create a mapping of a plurality of devices of a networked computing environment. As described above, a device of the networked computing environment may include a server 102, a virtual machine 104, a client 108, and/or a networking device of the network 106. In certain embodiments, the mapping module 202 also identifies one or more clients 108 connected to the networked computing environment, such as a smart phone or tablet computer. A client 108 may be connected to the server 102, or a virtual machine 104 running on the server 102, through the network 106. In one embodiment, the mapping is a snapshot of the connections/relationships between the devices of the plurality of devices at a specific time.

In certain embodiments, the mapping generated by the mapping module 202 describes a relationship between a primary device and at least one device of the plurality of devices. In one embodiment, the relationship is based on a connection between the primary device and secondary device. For example, a client 108 connected to a virtual machine 104 running on a server 102 would have a strong relationship with the virtual machine 104. On the other hand, the same client 108 would have a weaker relationship with a different virtual machine 104 running on the same server 102. Moreover, the same client 108 would have an even weaker relationship to a virtual machine 104 running on a different server 102. Thus, more distant connections may have weaker relationships with the primary device than more direct connections.

In one embodiment, the mapping module 202 automatically discovers devices comprising the mapping of the plurality of devices. In certain embodiments, the mapping module 202 discovers devices that have a relationship and/or connection to the primary device. For example, based on the connections between a server 102 and the plurality of devices, the mapping module 202 automatically discovers the devices that have a connection to the server 102, either directly or indirectly, based on the network connections between the devices. The mapping module 202, for example, may follow network connections to a predefined depth in order to discover devices of interest and consequently create the mapping of devices of the networked computing environment. In other embodiments, the mapping module 202 accesses information that includes connection information between devices. For example, the mapping module 202 may access a device lookup table maintained by a network device, such as a router, in order to discover devices connected to the network device.

In one embodiment, the mapping module 202 creates a mapping of the networked computing environment based on a relationship level between the primary device and the plurality of devices. A user (e.g., a network administrator), in certain embodiments, configures a relationship level threshold in order to customize the type of mapping that the mapping module 202 creates. For example, the user may specify that the mapping module 202 only create a mapping of devices associated with the primary device that have a relationship level of 1.0, which may be defined as a strong relationship. In some embodiments, the threshold relationship level can be set to zero, which would signal to the mapping module 202 to create a mapping of all devices that have any relationship to the primary device, no matter how tenuous. The mapping module 202, in another embodiment, creates a mapping of a subset of the networked computing environment based on input from the user, such as a relationship strength, a device type, and/or the like. For example, the user may specify only generating a mapping of devices directly connected (e.g., devices with a strong relationship) to the primary device. Alternatively, the user may specify only generating a mapping of servers 102 associated with the primary device.

In another embodiment, the mapping module 202 creates a mapping of the networked computing environment based on the real-time interactions between the primary device and the plurality of devices. Thus, even though a primary device may be directly connected to another device, if there are no real-time interactions between the devices, the mapping module 202 will not include the device connected to the primary device in the mapping. For example, an inactive virtual machine 104 running on a server 102 may not be included in a mapping associated with the server 102 if there are no real-time interactions between the virtual machine 104 and the server 102.

In this manner, the mapping module 202 may report to a user, such as a network administrator, the various devices that are connected to a primary device. Consequently, the mapping generated by the mapping module 202 provides information regarding the devices that may be effected by an action performed on the primary device. The action performed on the primary device may include a shutdown, an upgrade, a reboot, a software install/remove, and/or the like, which may cause a ripple effect throughout the devices connected to the primary device and, ultimately, effect the availability of the networked computing environment. Thus, it may be beneficial to simulate an action on the primary device in order to determine the consequences of the action before actually performing the action.

The network planning apparatus 110, in another embodiment, includes an action module 204 configured to determine a plurality of potential actions to be performed on the primary device. A potential action, in certain embodiments, includes an action effecting the primary device, devices associated with the primary devices, client devices, the network, and/or the like. For example, the potential actions for a server 102 may include a shutdown action, a reboot action, an upgrade action, a software install/remove action, a virtual machine provisioning action, and/or the like. A shutdown action, for example, may have an effect not only on the server 102, but also on any devices connected to the server 102, any virtual machines 104 running on the server 102, and/or the like. In another example, a potential action for a network router may include a shutdown action, a reboot action, a firmware upgrade action, and/or the like.

In another embodiment, a potential action determined by the action module 204 is a scheduled action, such as a scheduled maintenance action performed on a server 102. For example, an action to perform a scheduled backup of a device, such as a server 102, may require bringing a web server and/or database down, which would have an effect on clients 108 connected to the server 102. In certain embodiments, the action module 204 determines a user-generated potential action, such as an action performed by a network administrator, a database administrator, and/or the like. In another embodiment, the action module 204 determines an agent-generated potential action to be performed by an automated agent. Thus, similar to the example above, a backup agent may trigger backup actions, which may be detected by the action module 204, on one or more servers 102 and/or virtual machines 104. The action module 204, in some embodiments, determines previously executed actions and provides a list of previously executed actions to a user.

In one embodiment, the network planning apparatus 110 includes a calculation module 206 configured to calculate an effect of a potential action of a plurality of potential actions on the plurality of devices in response to simulating performing the potential action on the primary device. Thus, instead of performing the actual action on a primary device and then calculating the effect of that action, the calculation module 206 calculates the effect of a potential action based on a simulation of the action being performed on the primary device. In this manner, the calculation module 206 communicates to a user, such as network administrator, the consequences of an action before the action is actually performed, which allows the user to prepare, plan, and optimize when and how actions are performed within the networked computing environment. The calculation module 206, in some embodiments, calculates the effect of the simulated action on a device, a task running on the device, users of the device, the entire networked computing environment, and/or the like.

The calculation module 206, in certain embodiments, calculates the effect of the action using the relationship between the plurality of devices from the mapping created by the mapping module 202. For example, the calculation module 206 may follow the relationship between a primary server 102 (e.g., the server where the action is performed) and a different server 102 on the mapping, and, based on the connectedness of the relationship, determine how the action performed on the primary server 102 will impact the other server. In certain embodiments, the calculation module 206 uses real-time interactions between the plurality of devices to determine the calculated effect. In such an embodiment, the calculation module 206 regularly updates the calculated effect based on the real-time interactions between devices. For example, the calculation module 206 may update the calculated effect every 30 seconds, 5 minutes, and/or the like. In another example, the calculation module 206 may update the calculated effect in response to the mapping module 202 updating the mapping of devices based on the real-time interactions between the plurality of devices. In this manner, the optimal time to perform a particular action on the primary device may be determined based on the calculated effect determined by the calculation module 206.

In a further embodiment, the calculation module 206 calculates the effect of a potential action that is scheduled to be performed as a particular time in response to simulating performing the potential action at the particular time. For example, in order to calculate the effect of a shutdown performed at 3 a.m. on a server 102, the calculation module 206 calculates the effect of the action simulated at 3 a.m. based on a mapping of the plurality of devices created by the mapping module 202 at the same time.

In certain embodiments, the calculated effect includes calculating the number of devices effected by the potential action and/or the number of users effected by the potential action. For example, the calculation module 206 may determine the total number of devices and/or users effected by a shutdown of a server 102. In some embodiments, the calculated effect includes a duration of the effect of the action. In a further embodiment, the calculated effect includes a frequency of the effect of potential action that is regularly performed. In another example, the calculation module 206 may calculate the duration of the effect of a shutdown of a server 102, while factoring in the frequency of the action and the subsequent effect on the other devices and users.

In another embodiment, the calculated effect includes calculating the degree of impact of the potential action on a device of the plurality of devices. The degree of impact, in some embodiments, includes a combination of difference factors, such as the number of users effected by the action, the number of devices affected by the action, the duration of the action, the frequency of the action, and/or the like. In certain embodiments, the calculation module 206 calculates an effect level associated with a device based on the degree of impact of the action. For example, if a server 102 is shutdown, the calculation module 206 may assign an effect level to a virtual machine 104 running on the server 102 by factoring in the number of users effected, the duration of the effect, and the frequency of the effect. As described below with reference to FIG. 3, a ranking module 318 may use the effect level assigned to a device effected by the action to rank the devices.

In a further embodiment, the network planning apparatus 110 includes an optimization module 208 configured to perform an optimization action in response to calculating the effect of the potential action. As described below with reference to FIG. 3, the optimization action comprises one or more actions that maximizes the availability of the networked computing environment. The optimization module 208, in another embodiment, provides information to a user, such as a network administrator, regarding the calculated effect such that the user can prepare an optimization plan for the execution of particular actions on the networked computing environment. The optimization module 208, in some embodiments, includes various modules 302-312, as depicted in FIG. 3, that execute at least a portion of the operations of the optimization module 208.

Figure 3:
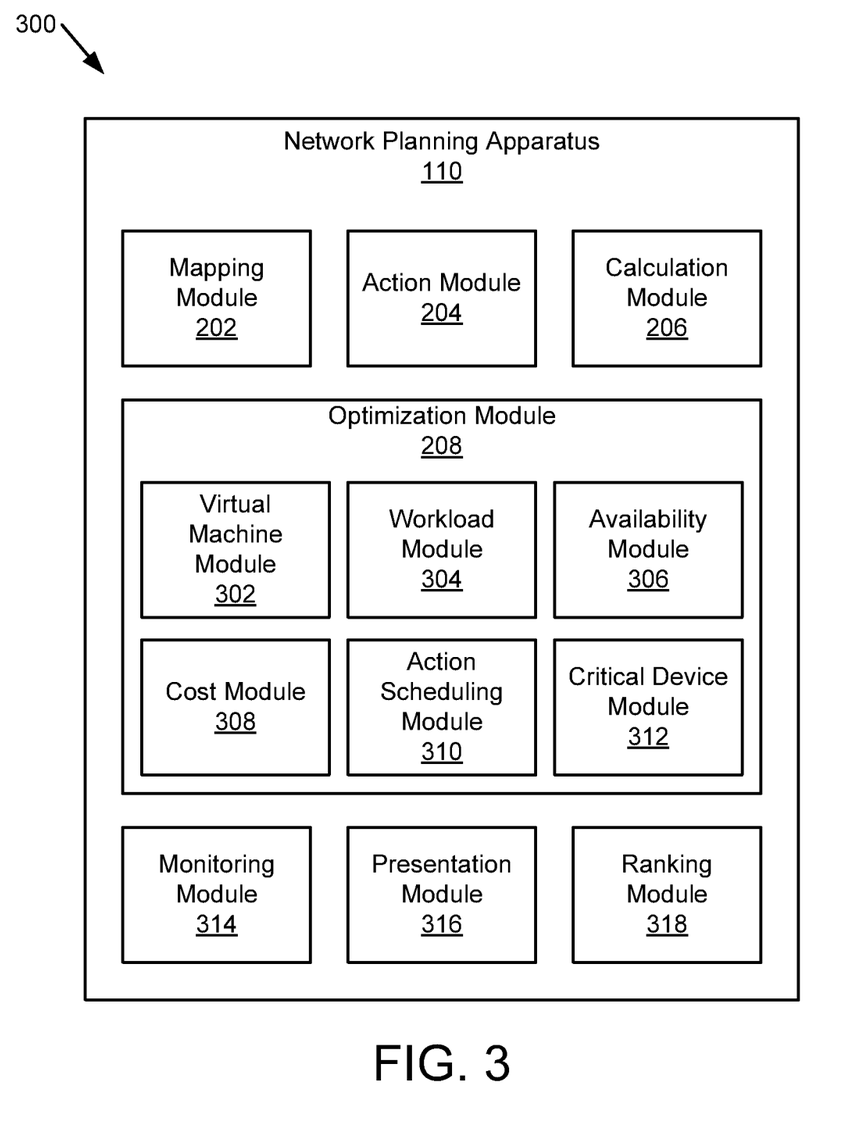
FIG. 3 is a schematic block diagram illustrating another embodiment of an apparatus for calculating the effect of an action on a network.

FIG. 3 depicts another embodiment of an apparatus 300 for calculating the effect of an action on a network. In one embodiment, the apparatus 300 includes a network planning apparatus 110. The network planning apparatus 110, in certain embodiments, includes a mapping module 202, an action module 204, a calculation module 206, and an optimization module 208, which are substantially similar to the mapping module 202, action module 204, calculation module 206, and optimization module 208 of FIG. 2. Additionally, in certain embodiments, the network planning apparatus 110 includes a virtual machine module 302, a workload module 304, an availability module 306, a cost module 308, an action scheduling module 310, a critical device module 312, a monitoring module 314, a presentation module 316, and a ranking module 318, which are described below in more detail. In certain embodiments, the optimization module 208 uses at least a portion of modules 302-312 to perform its operations.

In one embodiment, the network planning apparatus 110 includes a virtual machine module 302 configured to predict an optimal placement of a virtual machine 104 within the networked computing environment according to the calculated effect of the potential action. For example, if a critical virtual machine 104 is shutdown, the virtual machine module 302 may predict an optimal placement of a redundant virtual machine 104 that mirrors the critical virtual machine 104 in order to maintain availability of the critical virtual machine 104 effected by the shutdown action. In one embodiment, the virtual machine module 302 is used by the optimization module 208 to perform the optimization action, i.e., predicting the optimal placement of the virtual machine.

In certain embodiments, the virtual machine module 302 determines the optimal placement of the virtual machine 104 according to a real-time interaction heuristic of the plurality of devices of the networked computing environment. In certain embodiments, based on the real-time mapping of devices generated by the mapping module 202, the virtual machine module 302 determines the optimal placement of a virtual machine 104 to maximize availability of the networked computing environment. For example, based on the workload distribution between the plurality of devices at a given time, the virtual machine module 302 may determine the optimal placement of a virtual machine 104 to maximize the availability and efficiency of the networked computing environment. Moreover, the virtual machine module 302 may factor the calculated effect of one or more potential activities to be performed in order to determine the optimal placement of a virtual machine 104 at a particular time.

The network planning apparatus 110, in another embodiment, includes a workload module 304 configured to optimize workload scheduling associated with one or more devices of the plurality of devices according to the calculated effect of the potential action. As used herein, a workload refers to a device's ability to handle and process work in a given period of time. Thus, based on the calculated effect of a potential action, the workload module 304 can plan and distribute the computing workload associated with the plurality of devices in order to maintain a high-availability networked computing environment. For example, if a server 102 is planned to be shut down at a certain time, the workload module 304 can plan how to distribute the workload among the other devices based on the effect of the server 102 shutdown. In one embodiment, the workload module 304 is used by the optimization module 208 to perform the optimization action, i.e., optimizing scheduling of the workload among the plurality of devices.

In certain embodiments, the workload module 304 determines the optimal workload scheduling according to a real-time interaction heuristic of the plurality of devices of the networked computing environment. For example, the workload module 304 may plan how the workload will be divided among the plurality of devices at a given time based on the real-time interactions among the devices. Thus, if a server 102 is expecting to process a high workload at the same time as a scheduled shut down, the workload module 304 may distribute the server's 102 workload among the devices that have real-time interactions with the server 102, which may be based on the real-time mapping created by the mapping module 202.

In one embodiment, the network planning apparatus 110 includes an availability module 306 configured to predict an availability of a device of the plurality of devices according to the calculated effect of the potential action. In another embodiment, based on the mapping created by the mapping module 202, the availability module 306 predicts which, if any, devices may become unavailable as a result of an action being performed on a primary device. For example, in response to a software application being updated on a virtual machine 104, the availability module 306 may predict the availability of the virtual machine 104, and in particular the software application running on the virtual machine 104, and/or other devices that may be connected to the virtual machine 104. In a similar example, the availability module 304 may predict the availability of one or more servers 102 and virtual machines 104 based on a switch within the network 106 being shut down.

In one embodiment, the availability module 306 generates an action plan associated with potential actions that may have an effect on the availability of certain devices in the networked computing environment. In certain embodiments, one or more virtual machines 104 may be instantiated to compensate for the unavailability of one or more devices based on the optimal placement of the virtual machines being determined by the virtual machine module 302. In one embodiment, the availability module 306 is used by the optimization module 208 to perform the optimization action, i.e., predicting the availability of a device.

In a further embodiment, the network planning apparatus 110 includes a cost module 308 configured to determine a monetary cost of the calculated effect of the potential action. The monetary cost may define the cost of downtime caused by device shut downs, device upgrades, software upgrades, firmware upgrades, and/or the like. In certain embodiments, a potential action is performed in response to the calculated effect having a monetary cost below a predetermined threshold. The cost module 308, in one embodiment, determines an optimal cost threshold such that an action is only performed at a time when the cost of the action is minimal. For example, the cost module 308 may determine an action that may cause a server 102 to be shutdown has a higher cost during regular business hours than in the middle of the night. The cost module 308, in certain embodiments, creates recommendations and predictions of the most optimal times to perform an action based on the minimal cost of the action. The optimal cost threshold, as defined by the cost module 308, may be customized by the network administrator such that the network administrator may specify the cost threshold required to perform an action. In one embodiment, the cost module 308 is used by the optimization module 208 to perform the optimization action, i.e., determining the monetary cost of a potential action.

In another embodiment, the network planning apparatus 110 includes an action scheduling module 310 configured to determine the optimal time to perform the potential action according to the calculated effect of the potential action such that the effect of the potential action on the plurality of devices is minimal. For example, the action scheduling module 310 may determine that the optimal time to schedule a shutdown action on a server 102 is sometime in the middle of the night instead of during regular business hours because shutting down the server 102 may cause one or more devices (e.g., virtual machines 104) to be unavailable. A network administrator may use this information to schedule performing actions at optimal times such that the effect of the action on the availability of the plurality of devices is minimal.

In some embodiments, the action scheduling module 310 uses the mapping of real-time interactions created by the mapping module 202 to determine the optimal time to perform an action based on the effect of the action on the real-time interactions. Thus, in some embodiments, performing an action during regular business hours may be the most optimal time to perform the action if the action scheduling module 310 determines the effect of the action at that time has the least effect on the interactions between the plurality of devices. In one embodiment, the action scheduling module 310 is used by the optimization module 208 to perform the optimization action, i.e., determining the optimal time to perform the potential action.

The network planning apparatus 110, in certain embodiments, includes a critical device module 312 configured to maintain an availability of a critical device. The critical device module 312, in certain embodiments, determines a critical device by calculating a criticality factor associated with the device, which defines the importance of the device to the operation of the networked computing environment. The critical device module 312, in some embodiments, tags a device having a criticality factor above a predetermined threshold as a critical device. Thus, for example, a primary server 102 running a plurality of virtual machines 104, databases, and web servers may be tagged by the critical device module 312 as a critical device based on the importance of the server 102 to the networked computing environment. The criticality factor, as determined by the critical device module 312, may be calculated using factors such as the type of device, the number of users connected to the device, the number of relationships with other devices, the types of services running on the device, the effect of the unavailability of the device, and/or the like.

In this manner, the critical device module 312 communicates to a network administrator the devices that are critical to the functioning of the networked computing environment. This information may be used to plan performing actions accordingly, in order to maintain the availability of the networked computing environment. For example, a network administrator can ensure that an action is not performed that may have an effect on more than one critical device at the same time. Thus, if an action is going to effect the availability of a critical device, as determined by the critical device module 312, the network administrator can plan to perform the action at a time when availability of the device is least necessary. Alternatively, the network administrator can change the workload schedule, instantiate virtual machines 104, and/or the like to compensate for the downtime of the critical device. In one embodiment, the critical device module 312 is used by the optimization module 208 to perform the optimization action, i.e., determining critical devices within the networked computing environment.

In one embodiment, the network planning apparatus 110 includes a monitoring module 314 configured to monitor one or more simulated actions. In one embodiment, monitoring a simulated action includes collecting data associated with the simulated action, such as the calculated effect of the action, the time the action was performed, the type of action performed, the device where the action was performed, and/or the like. In another embodiment, the monitoring module 314 analyzes the calculated effects of the one or more simulated actions in order to provide intelligent recommendations associated with maintaining the availability of the networked computing environment. For example, the monitoring module 314 may continuously monitor previously simulated actions and collect data associated with the calculated effects of those actions. The monitoring module 314 may also analyze the collected data in order to provide intelligent recommendations, such as the optimal times to perform an action, an optimal sequence to perform multiple actions, and/or the like, such that the impact of one or more actions on the networked computing environment is minimal.

The network planning apparatus 110, in some embodiments, includes a presentation module 316 configured to present the calculated effect of a potential action to a user. In certain embodiments, the presentation module 316 displays the calculated effect on a visual map comprising the plurality of devices of the networked computing environment. For example, the presentation module 316 may present the calculated effect of a potential action on a visual representation of the mapping created by the mapping module 202. Thus, the visual map may include different visual cues of the calculated effect of a potential action such that a network administrator can easily and quickly get an overview of the impact of the potential action. For example, the presentation module 316 may highlight the devices that have been tagged as critical devices by the critical device module 312, visually highlight all the devices that may be effected by the potential action, the effect level of associated with each device, a relationship level associated with a device describing the relationship between a device and the primary device, and/or the like. Moreover, the presentation module 316 may display an estimate of the number of users affected by the action being performed at a specific time.

In another embodiment, the presentation module 316 presents one or more optimization results as determined by the optimization module 208. For example, the presentation module 316 may display the optimal times to perform an action, the optimal placement of a virtual machine 104 at a specific period of time, the optimal scheduling of a workload at a specific time, availability predictions, monetary costs associated with the action, and/or the like. In this manner, a network administrator, or similar user, may view results based on a simulation of the action being performed on a primary device at a specific and can prepare for the impact of performing the actual action on the primary device. Moreover, based on the data collected by the monitoring module 314, together with the results determined by the optimization module 208, the network administrator may prepare an optimization plan to maintain the availability of the networked computing environment at a high level while performing one or more actions.

The network planning apparatus 110, in certain embodiments, includes a ranking module 318 configured to rank a device according to an effect level associated with the device. In one embodiment the calculation module 206 calculates an effect level for each device of the plurality of devices. In some embodiments, the effect level defines the magnitude of the calculated effect of the potential action on a device. The ranking module 318, in one embodiment, compares the effect level of the device to the effect level of a different device in order to rank the device. For example, a server 102 having a higher effect level than a network switch will be ranked higher than the network switch. In certain embodiments, a list of devices sorted according to rank is presented to a user by the presentation module 316. In this manner, a user, such as a network administrator, can quickly view which devices are impacted the most by performing the action and can plan accordingly. The presentation module 316 may also display a device's rank next to a representation of the device on the visual map.

Figure 4:
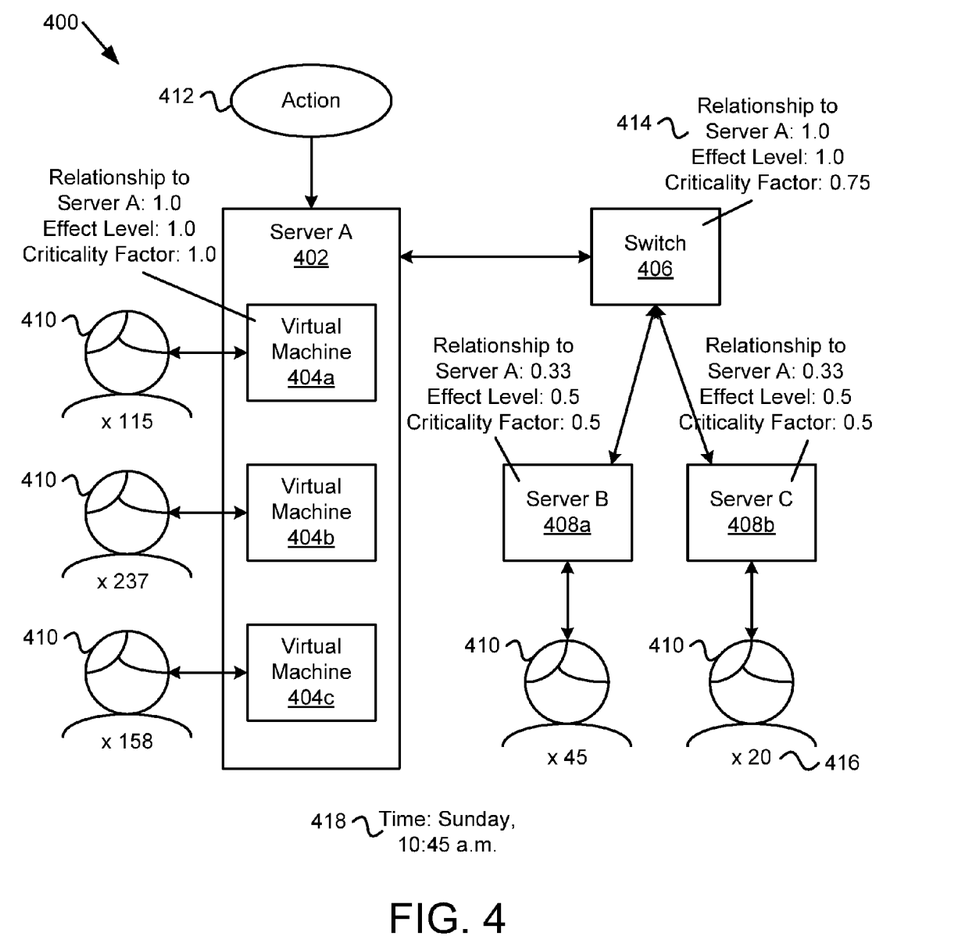
FIG. 4 is a schematic block diagram illustrating one embodiment of a mapping of a networked computing environment.

FIG. 4 depicts one embodiment of a mapping 400 of a networked computing environment. In one embodiment, the mapping 400 includes a server 'A' 402, which includes a plurality of virtual machines 404a-c. The mapping 400, in a further embodiment, includes a network switch 406, a server 'B' 408a, a server 'C' 408b, and a plurality of users 410, which are described in more detail below.

In certain embodiments, the mapping 400 is visually presented to a user (e.g., a network administrator) by the presentation module 316 such that the user can get an overview of the networked computing environment and the effect that an action performed on a device may have on other devices. In one embodiment, the mapping 400 is a snapshot of the networked computing environment at a particular time. In the depicted embodiment, server 'A' 402 is the primary device, meaning that server 'A' 402 has been selected as the target device to perform a potential action 412. Server 'A' 402, in another embodiment, includes a plurality of virtual machines 404a-c, with each virtual machine 404a-c having one or more connected users 410. In a further embodiment, server 'A' 402 is connected to a network switch 406. The switch 406 may also be connected to server 'B' 408a and server 'C' 408b, with each server 408a-b also having one or more connected users 410.

In certain embodiments, the mapping 400 describes the relationships between the primary device, e.g., server 'A' 402, and the other devices in the networked computing environment. The action 412 may be a potential action 412, which is representative of an actual action that may be performed on the networked computing environment. The potential action 412 may be simulated on server 'A' 402 in order to calculate the effect of the action on the plurality of devices having a relationship with server 'A' 402. For example, the action 412 may be a shutdown action that causes server 'A' 402 to be shut down for a certain amount of time. The calculation module 206, in one embodiment, calculates the effect of the action 412 on the plurality of devices in response to simulating performing the action 412 on server 'A' 402.

The calculated effect, as determined by the calculation module 206, of a shutdown action, for example, may include calculating the number of devices and/or users effected by the shutdown action, the duration of the calculated effect, the frequency of the calculated effect, and an overall impact of the action on a device. For example, in the depicted embodiment, in response to a shutdown action performed on server 'A' 402, the virtual machines 404a-c would also be shut down and unavailable to their connected users 410. Moreover, server 'B' 408a and server 'C' 408b may be effected to some degree if, for example, the servers 408a-b access data stored on server 'A' 402.

The mapping 400, in certain embodiments, presents information 414 associated with each device such that a network administrator can better determine how to react to the calculated effect of the action on a per device level. The displayed information 414 may include a relationship strength, an effect level, and a criticality factor. Thus, virtual machine 404a may have a strong relationship with server 'A' 402 e.g., a strength value of '1.0' may correspond to a strong relationship). Further, virtual machine 404a may also have a high effect level, meaning that the action performed on server 'A' 402 will have a direct effect on virtual machine 404a. Moreover, the criticality factor of virtual machine 404a, in this case '1.0', indicates that this virtual machine 404a is a critical device. Therefore, a network administrator, for example, may plan to start a cloned or mirrored virtual machine on a different server to compensate for the time that virtual machine 404a is down. Moreover, the number of users 416 connected and/or effected by the action at a particular time may be presented on the mapping 400.

In some embodiments, a time period 418 is presented on the mapping 400 in order to simulate the action being performed at a particular day and/or time. Simulating performing an action at a specific time enables a network administrator to schedule the performance of one or more actions such that the calculated effect of the actions is minimal. For example, the optimal time for a shut down action may be during a time when the number of users connected to a device is the lowest or when the number of interactions between the devices is minimal. The mapping 400, therefore, provides a user (e.g., network administrator) a way to identify the devices in the networked computing environment, including critical devices and how a performed action will impact the devices and/or users connected to the devices. The network administrator, in response to receiving this information, may plan the timing of performing actions and may optimize the availability of the networked computing environment in light of the calculated effect of the performed actions.

Figure 5:
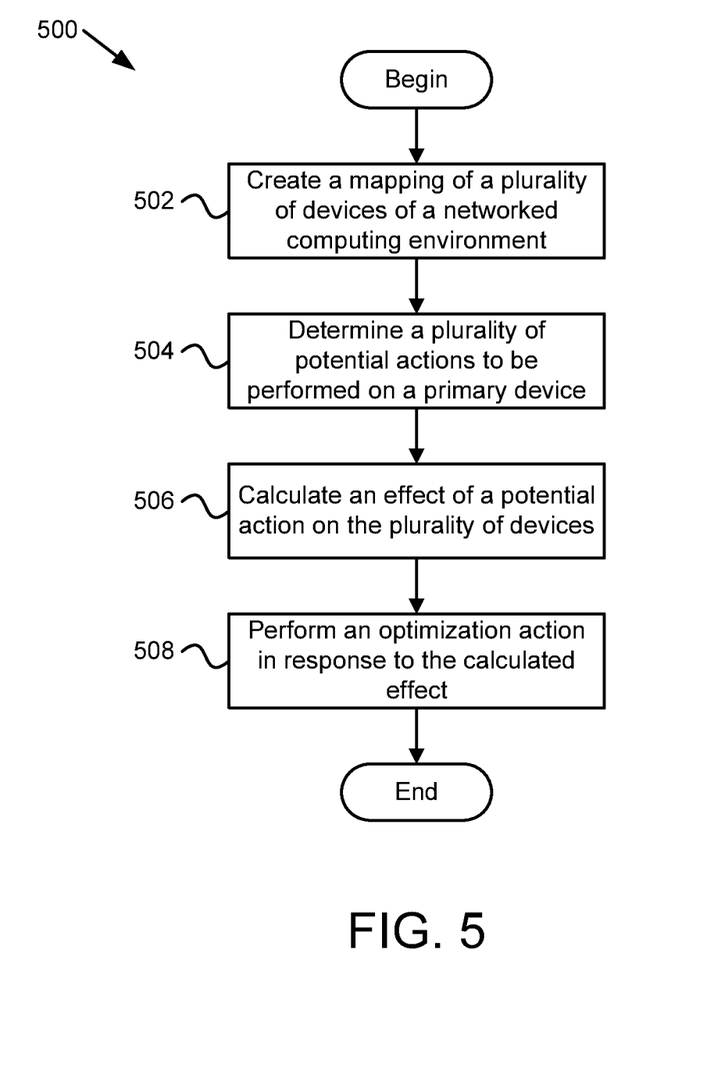
FIG. 5 is a schematic flow chart diagram illustrating one embodiment of a method for calculating the effect of an action on a network.

FIG. 5 depicts one embodiment of a method 500 for calculating the effect of an action on a network. In one embodiment, the method 500 begins and a mapping module 202 creates 502 a mapping on a plurality of devices of a networked computing environment. In certain embodiments, the mapping describes a relationship between a primary device and at least one device of the plurality of devices. In another embodiment, an action module 204 determines 504 a plurality of potential actions to be performed on a primary device. A calculation module 206, in a further embodiment, calculates 506 an effect of a potential action of the plurality of potential actions on the plurality of devices in response to simulating performing the potential action on the primary device. In one embodiment, an optimization module 208 performs 508 an optimization action in response to calculating the effect of the potential action such that the optimization action maximizes the availability of the networked computing environment. And the method 500 ends.

Figure 6:
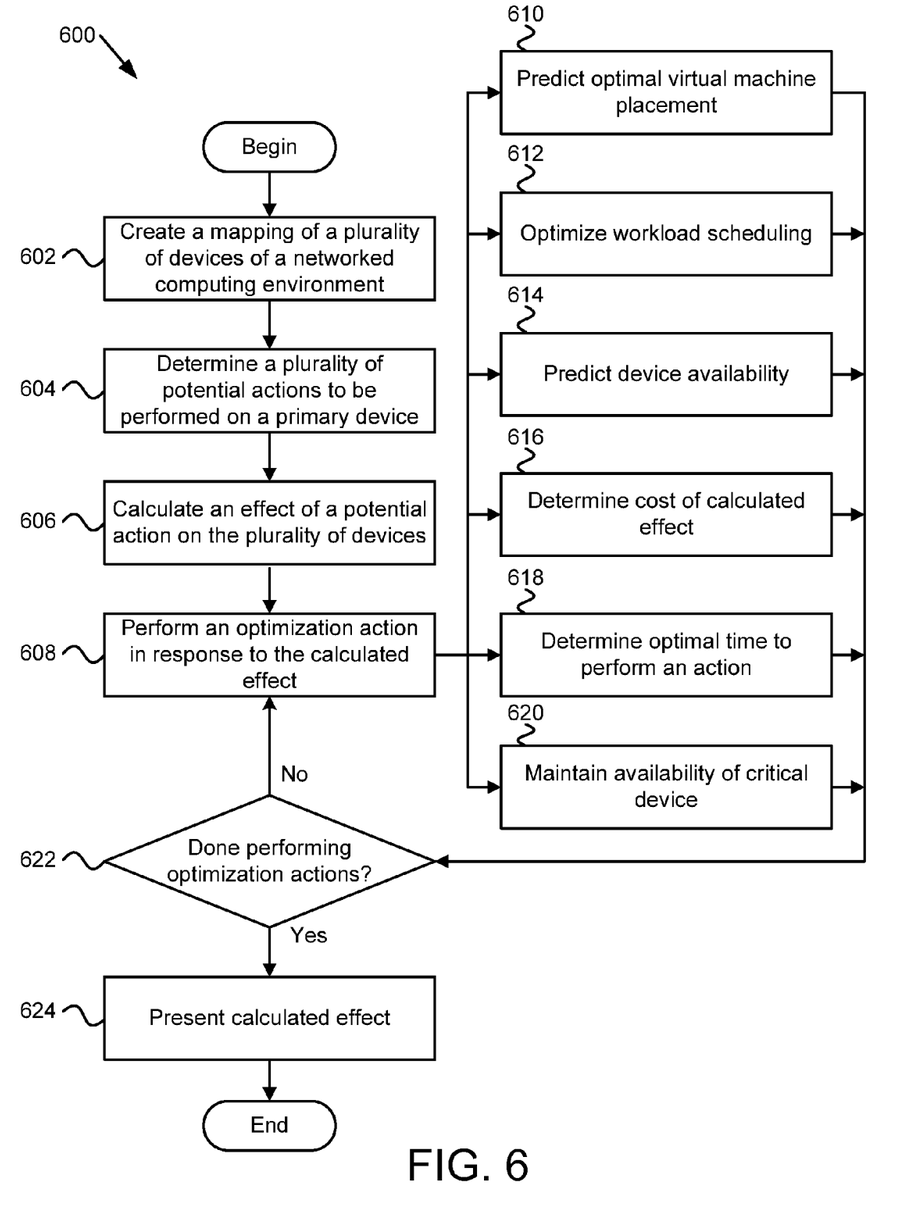
FIG. 6 is a schematic flow chart diagram illustrating another embodiment of a method for calculating the effect of an action on a network.

FIG. 6 depicts another embodiment of a method 600 for calculating the effect of an action on a network. In one embodiment, the method 600 begins and a mapping module 202 creates 602 a mapping on a plurality of devices of a networked computing environment. In another embodiment, an action module 204 determines 604 a plurality of potential actions to be performed on a primary device. A calculation module 206, in a further embodiment, calculates 606 an effect of a potential action of the plurality of potential actions on the plurality of devices in response to simulating performing the potential action on the primary device. In one embodiment, an optimization module 208 performs 508 an optimization action in response to calculating the effect of the potential action. An optimization action, in certain embodiments, maximizes the availability of the networked computing environment.

In one embodiment, the optimization action includes predicting 610 the optimal placement of a virtual machine 104 within the networked computing environment according to the calculated effect of the potential action. In certain embodiments, a virtual machine module 302 predicts 610 the optimal placement of the virtual machine 104. In another embodiment, the optimization action includes optimizing 612 workload scheduling associated with one or more devices of the plurality of devices. In one embodiment, a workload module 304 optimizes 612 workload scheduling of the plurality of devices. In a further embodiment, the optimization action includes predicting 614 the availability of one or more devices of the plurality of devices according to the calculated effect of the potential action. In certain embodiments, an availability module 306 predicts 614 the availability of a device.

In one embodiment, the optimization action includes determining 616 the monetary cost of the calculated effect of the potential action. In some embodiments, a cost module 308 determines 616 the monetary cost of the calculated effect. In another embodiment, the optimization action includes determining 618 the optimal time to perform the potential action according to the calculated effect of the potential action such that the effect of the potential action on the plurality of devices is minimal. In one embodiment, an action scheduling module 310 determines 618 the optimal time to perform a potential action. In yet another embodiment, the optimization action includes maintaining 620 an availability of a critical device, which is identified based on a criticality factor associated with the device. In one embodiment, a critical device module 312 maintains 620 the availability of a critical device.

After an optimization action is performed, in one embodiment, the optimization module 208 determines 622 whether there are more optimization actions to be performed. If the optimization module 208 determines 622 there are more optimization actions to be performed, the optimization module 208 performs 608 the optimization action according to the calculated effect. Otherwise, a presentation module 316 presents the calculated effect of the potential action to a user. In some embodiments, the presentation module 316 presents the calculated effect on a visual map that includes the plurality of devices of the networked computing environment. And the method 600 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
creating a mapping of a plurality of devices of a networked computing environment, the mapping describing a relationship between a primary device and at least one device of the plurality of devices, the relationship between the primary device and the at least one device being determined as a function of real-time interactions between the primary device and the at least one device, wherein the mapping of the plurality of devices is periodically updated based on the real-time interactions;
determining a plurality of potential actions to be performed on the primary device;
calculating an effect of a potential action of the plurality of potential actions on the plurality of devices in response to simulating performing the potential action on the primary device, the calculated effect being updated in response to the mapping of the plurality of devices being updated;
determining a monetary cost of the calculated effect of the potential action;
performing an optimization action in response to the monetary cost of the calculated effect being below a predetermined threshold; and
determining an optimal time to perform the potential action according to the calculated effect of the potential action, the optimal time comprising a time when the monetary cost of the calculated effect of the potential action is minimal, wherein the optimization action comprises scheduling the potential action to be performed at the determined optimal time, wherein the optimal time to perform the potential action is updated in response to the calculated effect being updated according to the real-time interactions between the plurality of devices.

2. The method of claim 1, wherein the optimization action comprises predicting an optimal placement of a virtual machine within the networked computing environment according to the calculated effect of the potential action.

3. The method of claim 2, wherein the optimal placement of the virtual machine is determined according to a real-time interaction heuristic of the plurality of devices of the networked computing environment.

4. The method of claim 1, wherein the optimization action comprises optimizing workload scheduling associated with one or more devices of the plurality of devices according to the calculated effect of the potential action.

5. The method of claim 4, wherein the optimal workload scheduling is determined according to a real-time interaction heuristic of the plurality of devices of the networked computing environment.

6. The method of claim 1, wherein the optimization action comprises predicting an availability of a device of the plurality of devices according to the calculated effect of the potential action.

7. The method of claim 1, wherein the optimization action comprises maintaining an availability of a critical device, the critical device determined according to a criticality factor, the criticality factor defining an importance of the device to an operation of the networked computing environment, wherein a device with a criticality factor above predetermined threshold is tagged as a critical device.

8. The method of claim 1, further comprising monitoring one or more simulated actions, wherein one or more calculated effects of the one or more simulated actions are analyzed to provide one or more intelligent recommendations associated with maintaining the availability of the networked computing environment.

9. The method of claim 1, further comprising presenting the calculated effect of the potential action to a user, the calculated effect being displayed on a visual map comprising the plurality of devices of the networked computing environment.

10. The method of claim 1, further comprising ranking a device according to an effect level associated with the device, the effect level defining a magnitude of the calculated effect of the potential action on the device, wherein the effect level of the device is compared to the effect level of a different device.

11. The method of claim 1, wherein the mapping of the plurality of devices is created according to real-time interactions between the primary device and the plurality of devices.

12. The method of claim 1, wherein the calculated effect comprises one or more of:
   a count of devices effected by the potential action;
   a count of users effected by the potential action;
   a degree of impact of the potential action on a device of the plurality of devices;
   a duration of the calculated effect of the potential action; and
   a frequency of the calculated effect of a regularly performed potential action.

13. The method of claim 1, wherein calculating an effect of a potential action of the plurality of potential actions on the plurality of devices comprises using the relationship between the plurality of devices from the mapping to calculate the effect of the potential action on the plurality of devices.

* * * * *